US008586137B2

(12) United States Patent
Steinmann et al.

(10) Patent No.: US 8,586,137 B2
(45) Date of Patent: Nov. 19, 2013

(54) METHOD AND SYSTEM FOR APPLYING PARTICULATE SOLIDS ON A SUBSTRATE

(75) Inventors: Pius Steinmann, Menznau (CH); Christian Huebner, Lucerne (CH); Erich Bauer, Bodmann/Ludwigshafen (DE)

(73) Assignee: Kronotec AG, Lucerne (CH)

( * ) Notice: Subject to any disclaimer, the term of this patent is extended or adjusted under 35 U.S.C. 154(b) by 0 days.

(21) Appl. No.: 13/346,846

(22) Filed: Jan. 10, 2012

(65) Prior Publication Data

US 2012/0107497 A1 May 3, 2012

Related U.S. Application Data

(62) Division of application No. 11/640,059, filed on Dec. 15, 2006, now Pat. No. 8,096,261.

(30) Foreign Application Priority Data

Dec. 16, 2005 (DE) ......................... 10 2005 060 754

(51) Int. Cl.
*B32B 5/16* (2006.01)

(52) U.S. Cl.
USPC ........... 427/201; 427/202; 427/204; 427/205; 427/163.4; 51/298; 428/323; 428/402; 428/403

(58) Field of Classification Search
USPC ......... 427/202, 204, 205, 163.4, 201; 51/298; 428/323, 402, 403
See application file for complete search history.

(56) References Cited

U.S. PATENT DOCUMENTS

| | | | | |
|---|---|---|---|---|
| 5,681,361 | A * | 10/1997 | Sanders, Jr. | 51/295 |
| 7,465,473 | B2 * | 12/2008 | Stevenson et al. | 427/202 |
| 8,096,261 | B2 * | 1/2012 | Steinmann et al. | 118/302 |

FOREIGN PATENT DOCUMENTS

| | | |
|---|---|---|
| DE | 195 08 797 | 8/1996 |
| DE | 196 04 907 | 8/1997 |
| WO | 0044984 | 8/2000 |
| WO | 2005042644 | 5/2005 |

* cited by examiner

*Primary Examiner* — Leszek Kiliman
(74) *Attorney, Agent, or Firm* — Bachman & LaPointe, P.C.

(57) ABSTRACT

The present invention relates to a method for spraying particulate solids onto a substrate, comprising the steps of:
coating the substrate with a wet and/or adhesive synthetic resin layer,
building up a gas pressure in a line,
generating a pressure differential in the line,
swirling and carrying along particulate solids in the line,
ejecting swirled, particulate solids from the line onto the surface of the wet and/or adhesive synthetic resin layer of the substrate. The invention also relates to a substrate, in particular a wood-based panel or decorative paper, at least partially coated with a particulate solid, characterized in that the particulate solid is applied to the substrate with an accuracy of up to ±0.8 g/m$^2$, preferably of up to ±0.5 g/m$^2$, particularly preferably of up to ±0.3 g/m$^2$, preferably of up to 0.1 g/m$^2$.

8 Claims, 3 Drawing Sheets

METHOD AND SYSTEM FOR APPLYING PARTICULATE SOLIDS ON A SUBSTRATE

This application is a divisional application of U.S. application Ser. No. 11/640,059 filed Dec. 15, 2006.

BACKGROUND OF THE INVENTION

The invention relates to a method and a system for introducing particulate solids into a substrate.

In the following, especially papers, in particular carrier papers or decorative papers, but also boards and panels of plastic material, wood or wood-based material, which are used on the ceiling, wall or floor, will be referred to as substrates.

Applying particulate solids is interesting in particular, when thin layers of particulate solids are to be applied on a substrate. The particulate solids are relatively heavy and hard. They have a specific weight of more than 2 g/cm$^3$, often more than 3 g/cm$^3$. The Mohs-hardness amounts to 8-10. The typical case of application of the present invention is the application of corundum, silicates or other particulate solids on a substrate in order to improve its surface properties. When corundum is applied, for example, on synthetic resin layers and surface coatings thereof, their abrasion resistance is improved. The essential precondition is that the particulate solids do not form the surface of the substrate. They must be embedded in a layer near the surface to achieve improved abrasion resistance, for example. Silicates dispersed in synthetic resin layers improve, for example, the scratch resistance of surface coatings.

Various technical approaches are known for the application of such particulate solids. A group of approaches aims at binding the particulate solids in liquids from the start, to then roll them on, cast them on or to spread them. In particular, WO 00/44984, DE 196 04 907 or DE 195 08 797 describe a dispersion containing particulate solids. This dispersion is applied by a flushing nozzle from below onto each substrate to be coated. Further it is suggested that additives be added to such dispersions to improve the handling of such particulate solids. The additives can be fibers and/or spherical bodies (glass spheres). It is disadvantageous that the manufacture and processing of the dispersion is very troublesome, as it has to be avoided, that the particulate solids settle. Even after short interruptions of production, the application apparatus must be fully cleaned, since the dispersion will otherwise block lines and nozzles. Moreover, the application amount varies strongly.

As an alternative, WO 2005/042644 suggests sprinkling such particulate solids onto the substrate. Particulate solids are sprinkled on the substrate via a roller arrangement, below which the substrate is passed. This arrangement is simple in its mechanic setup and operation, but the uniformity and precision of the application is not satisfactory and mechanical wear is very high. Moreover, in a second step, fibers must be applied on the surface of the substrate in a very troublesome manner and selectively oriented in order to ensure the embedding of the particulate solids.

All approaches must face the problem that the particulate solids, such as corundum, silicates or other particles are mostly extremely abrasive. The methods known from the state of the art therefore attempt to make the contact between the particulate solids and the corresponding conveying apparatus as delicate as possible to minimize the abrasion on the conveying apparatus. Embedding the particulate solids in synthetic resin, which is extremely troublesome in practice, effectively envelopes the particles. Sprinkling via a roller arrangement avoids interfering friction as far as possible.

SUMMARY OF THE INVENTION

It is therefore an object of the present invention to provide an apparatus and a method with which particulate solids can be applied on a substrate in an economical manner and embedded in a layer near the surface.

The approach according to the present invention provides an apparatus which is configured to spray particulate solids onto a substrate which is covered with a wet and/or adhesive synthetic resin layer, with the aid of a feed line, wherein, at its first end, means for generating a pressurized gas are arranged and, at its second end, it has a free opening which further has a reservoir for particulate solids and a nozzle for generating a pressure differential, wherein the reservoir and the nozzle are inserted in the feed line in such a way that in an operative state particulate solids are transferred and swirled from the reservoir into the feed line by the pressure differential generated by the nozzle, then transported to the free opening of the line from which the particulate solids are then ejected and sprayed into the wet and/or adhesive synthetic resin layer.

Tests have shown that, in contrast to views previously held by experts, spraying of particulate solids onto a substrate, and therefore spraying the particles into the wet and/or adhesive synthetic resin layer, is quite easily possible. Wear and tear on the apparatus is surprisingly small, in particular, when the solids particles are sufficiently swirled. The apparatus according to the present invention needs hardly any moving parts for spraying the particulate solids which is very advantageous for the industrial application. By exclusively spraying the solids particles it is achieved that the particulate solids are spread with particular precision.

The swirling, achieved among the solids particles as a result of the pressure differential is an essential precondition for uniform spraying of the particulate solids. A preferred embodiment of the apparatus according to the present invention provides that a Venturi nozzle is inserted in the feed line. It generates a vacuum in the line. The Venturi nozzle is inserted in the feed line of the apparatus according to the present invention in such a way that it sucks out the particulate solid out of the reservoir into the feed line by the vacuum it creates, and the particles are swirled and carried along by the gas flow where they remain a homogeneous gas-solid mixture, until they impact on the wet and/or adhesive synthetic resin layer of the substrate where the solids particles are deposited as an extremely uniform layer and sink into the synthetic resin layer. According to a further preferred embodiment of the apparatus according to the present invention, the particulate solids are fluidized in the reservoir in operation. Preferably they are passed through by air or another inert gas and are thus kept in movement in the reservoir.

According to another preferred embodiment, the apparatus according to claim 1 is provided with at least one spraying nozzle at the open end. The spraying nozzle allows the coating of the substrate to be precisely controlled. The form of the spraying cone can be adjusted as desired, depending on the choice of nozzle, to achieve a predetermined spraying result on the substrate. The form of the spraying nozzle also depends, for example, on whether the opening of the feed line is stationary or mobile (which will be discussed below). A wide spectrum of nozzles or nozzle openings can be used for the apparatus according to the present invention, for example, nozzles with openings in the form of a circular annulus or nozzles with openings in the form of a slit. To coat wider substrates, such as wood-based panels, it is also possible to arrange a plurality of spraying nozzles side by side. A plurality of spraying nozzles can be in communication with the end of the feed line via a manifold, without the uniformity of the spraying process being negatively affected. A plurality of apparatuses according to the present invention can also be arranged in parallel, each equipped with one or more nozzles. According to a further preferred embodiment the nozzles can be adjusted with regard to their longitudinal or trans-verse axes.

Depending on each case of application, the feed lines of the apparatus according to the present invention can be chosen. They can be rigid lines (tubes) or flexible lines (hoses). Hoses are advantageous in particular, when the opening of the second end or the spraying nozzle arranged there is configured to be mobile. Lines and spraying nozzles, but also the manifolds, can be made of plastic materials according to a preferred embodiment of the invention. The apparatus is thus comprised of lightweight components in a cost-effective manner. However, components of different materials can also be combined. The lines can have, for example, sections of metal and others of plastic. Ceramic components can also be used for the manufacture of the above-mentioned lines, spraying nozzles or manifolds.

Preferably the apparatus according to the present invention also has means for conveying the substrate. The substrate, depending on whether it is decorative paper, veneer or another wood-based material surface, can be simply placed on the conveying means or fixed there. It is then passed under the stationary or mobile opening or spraying nozzle of the apparatus and coated with the particulate solid. If necessary, the substrate can be fixed on the means for conveying, whether by vacuum, or by other means such as e.g. opposed rollers or conveying bands. The provision of such means for conveying enables the substrate to be coated with solid particles economically and on an industrial scale.

It is deemed a particular advantage of the present invention that the apparatus according to the present invention can also be used by itself. Preferably, however, the apparatus is incorporated in a system for surface coating. The application of synthetic resin or varnish on the wood-based material surfaces is usually carried out in impregnating plants or varnishing plants with operating speeds of about 30 m/min to about 100 m/min, often between 40 m/min and 60 m/min. With these operating speeds, the spraying apparatus according to the present invention can be easily integrated in these plants. The compact structure of the apparatus is of great advantage herefor. In integrated apparatuses, conveying means are often provided to transport the substrates to be processed or coated through all and sundry stations of the complex coating plants.

According to the present invention, a wide range of particulate solids can be processed in the apparatus according to claim 1. Often corundum is used, but the use of silicates, carbides or diamond powder is also conceivable. The particulate solids used have a specific weight of often more than 2 $g/cm^3$, often more than 3 $g/cm^3$, usually with diameters of 30 to 100 μm, preferably with diameters of 40 μm to 60 μm. They are embedded in synthetic resin layers on the surface of carrier or decorative papers by being sprayed on or into them, but they are also embedded in synthetic resin layers directly on the surface of wood-based materials, to improve the quality of the surface coating, typically to enhance the abrasion resistance or scratch resistance. Preferably, when the particulate solids are sprayed on or into the wet and/or adhesive synthetic resin layer, it has a layer thickness which is at least half of the average diameter of the particulate solid, which means layer thicknesses of 15 μm to 50 μm. When the particles are sprayed into the synthetic resin they are largely enveloped by it due to a displacement effect. Alternatively a further synthetic resin layer can be applied after the spraying process to complete the embedding of the particulate solids.

Almost any amount of solids particles can be applied to the substrate with the apparatus according to the present invention. It is surprising that tests have shown that small amounts of particulate solids can also be reliably and uniformly applied. Amounts of up to 100 $g/m^2$, preferably of up to 80 $g/m^2$, particularly preferably of up to 50 $g/m^2$, advantageously of up to 30 $g/m^2$, can be applied to the substrate with high precision by means of the apparatus according to the present invention and, as mentioned above, while maintaining a high working speed.

It is deemed as particularly advantageous, that a high uniformity can be achieved in the application of solids particles with the apparatus according to the present invention, which is superior to the prior art methods. The uniformity of the particle application is important in more than one respect; on the one hand an increased application of solids negatively affects the transparency of the substrate surface. On the other hand substantial safety margins have to be provided in the application of solids particles to offset strong variations in uniformity, when predetermined application amounts have to be complied with. This negatively affects costs and leads to increased wear on the application apparatuses.

According to the present invention, the solid particles can be sprinkled on the substrate with a precision of up to ±0.8 $g/m^2$, preferably of up to ±0.5 $g/m^2$. Particularly preferably, the application precision can be even more tightly defined, and is at up to ±0.3 $g/m^2$ according to the present invention. Advantageously an application precision of up to ±0.1 $g/m^2$ can be achieved. In prior art methods, the spreading precision achieved is above ±2 $g/m^2$. In contrast, the approach according to the present invention affords substantial economic and technical advantages.

The apparatus according to the present invention, according to an advantageous embodiment, affords various possibilities to individually adjust the application of the particulate solids. For instance, the free opening of the feed line, if necessary with the installed spraying nozzle, can be arranged moveable in parallel to the plane of the substrate to be coated, for example it can be traversable on a rail above the substrate to be coated. Alternatively or additionally, the distance to the surface can be varied. The movement of the free opening relative to the substrate is adapted to the feed velocity of the conveyer means which transports the substrate through the apparatus according to the present invention. Alternatively, the apparatus according to the present invention can also be adapted to the respective substrate by providing a corresponding number of spraying nozzles. Groups of nozzles can be connected, for example, to the end of the feed line via manifolds, to achieve a predetermined spreading pattern. The application of the particulate solids can therefore be individually adapted in a wide range to the substrate to be sprayed using the various possibilities of adjustment. Application methods known from the state of the art do not allow the application amount and the distribution of the particulate solids to be individually adjusted in this manner.

The apparatus according to the present invention, in a preferred embodiment, provides that further means for modifying, in particular for coating the particulate solids are present in the feed line. The modifying process can be a coating process, for example, to provide for better bonding of the particulate solids on the substrate or to give the particulate solids improved optical properties. Often the solids particles are silanized, for example, to achieve better adhesion on the substrate. The means for modifying are inserted in the line between the reservoir and the end opening, and then the substance for modifying is sprayed into the line or, preferably, sucked into the line in the same way as the particulate solids by means of a pressure differential, and to envelop the particulate solids.

The apparatus according to the present invention also allows varying amounts of particulate solids to be applied due to its high precision, i.e. a precise differentiation can be made between areas in which solids are applied to the substrate and areas in which less, more or no solids are applied to the substrate. This allows substrates to be produced having discrete sections with different amounts of particulate solids.

The method according to the present invention provides that particulate solids are sprinkled into a wet and/or an adhesive synthetic resin layer of a substrate, comprising the steps of:

- coating the substrate with a wet and/or adhesive synthetic resin layer,
- building up gas pressure in a feed line,
- generating a pressure differential in the line,
- swirling and carrying along of particulate solids having a specific weight of more than 2 g/cm$^3$ in the line,
- ejecting swirled particulate solids out of the line into the surface of the wet and/or adhesive synthetic resin layer of the substrate.

According to the present invention it is provided that particulate solids are sprayed into a synthetic resin layer having a wet and/or adhesive surface of a substrate. Spraying particulate solids into such a wet and/or adhesive substrate coated with synthetic resin allows the substrate to be extremely uniformly coated. Typically the substrate can have not yet completely reacted synthetic resin applied to it, or it can be coated with paint or varnish. It can also be decorative paper, however, impregnated with not yet dried melamine resin. Embedding the sprayed-on particulate solids in the wet and/or adhesive surface of the substrate requires the use of much less of these wet and/or adhesive coating substances than prior art methods, for example those which apply the solids particles in the form of dispersions. Subsequent drying or curing of the wet and/or adhesive coating additionally contributes to the fixing of the particulate solids. It is essential that the particulate solids penetrate the synthetic resin layer as deeply as possible. They should not lie on the surface of the synthetic resin layer but should be embedded in the layer.

It has proven advantageous to dry or cure the wet and/or adhesive synthetic resin layer after the insertion of the particulate solids. Usually this is done in a dryer or furnace, through which the coated substrate passes.

The present invention attempts to insert the sprayed-on particulate solid as completely as possible within the synthetic resin layer. Solids particles which do not penetrate into the synthetic resin layer or do not adhere to the surface of the substrate can be recycled to the reservoir by means of a vacuum system and subsequent visual inspection. If the method according to the present invention is carried out in a way in which the particulate solids do not deeply penetrate the synthetic resin layer and are therefore not completely enclosed by the synthetic resin, it is advisable to subsequently apply at least one layer of a synthetic resin to enclose the exposed portions of the particulate solids.

The method according to the present invention is implemented in the above described apparatus according to the present invention. It is simple and uncomplicated in its technical application, in particular it is insensitive with respect to standstill. The special requirement of the deep penetration of the particulate solids in the synthetic resin layer is excellently implemented. The relatively high specific weight of the particulate solids, in combination with the air flow causes sufficient penetration in the synthetic resin layer.

The gas pressure is built up with simple means, for example, by means of a pump or coupling to a centrally supplied pressurized-air line. The change-over from the higher to the reduced pressure is suitably realized by means of a nozzle, preferably by means of a Venturi nozzle. The particles are sucked out of the reservoir due to the pressure drop in the feed line caused by the nozzle, for example in accordance with the functioning principle of a glass filter pump.

According to another advantageous embodiment of the method according to the present invention, the spraying cone for spraying the solids onto the substrate is provided by a spraying nozzle set onto the free opening of the line. The spraying cone can be adapted to the individual requirement of each substrate as previously described in the description of the apparatus according to the invention by optimizing type and orientation of the spraying nozzle. Optimization of the spraying nozzle is carried out in practical tests.

The spraying nozzle can be configured, for example, so that the substrate is intermittently sprayed. This causes sections of the substrate, such as in strips or transverse stripes, to be sprinkled with solid. For instance, sections of a wall, ceiling or floor panel are only sprinkled in places where a surface provided with particulate solids is indeed desired. In places where separating saws are used to produce individual panels after sprinkling the solids particles, coating with particulate solids can be omitted or at least substantially reduced, where it would interfere and cause wear on the saws.

The above mentioned application amounts of up to 100 g/m$^2$ and in particular the precision of coating of up to 0.8 g/m$^2$, preferably of up to 0.1 g/m$^2$ can also be achieved by adapting the gas throughput, the nozzle geometry, in particular of the spreading nozzle, and the speed of the substrate movement relative to the apparatus, but also by increasing or reducing the distance between the substrate and the spraying nozzle. Obtaining the optimum adjustment of these parameters in conformity with the corresponding application is within the usual overhead for optimizing such apparatuses.

A substrate particularly uniformly coated with solids particles is also part of the subject matter of the present invention, wherein the particulate solids are inserted in a synthetic resin layer. Unlike previous substrates, decorative papers and panels can be provided, in particular, which are coated with particulate solids within stringent tolerances. The tolerance for the application amount of the particulate solids, according to a simple embodiment of the present invention, is up to ±0.8 g/m$^2$, the tolerance according to a preferred embodiment is up to ±0.5 g/m$^2$, particularly preferably up to ±0.3 g/m$^2$, advantageously up to ±0.1 g/m$^2$. The uniform layer distribution allows abrasion values for the respective substrate, such as for achieving a particular abrasion resistance, to be achieved with a more sparing use of solids particles than has been previously possible.

According to a preferred embodiment of the invention, the thus coated substrate is part of a multilayer surface coating. In particular, the synthetic resin layer according to the present invention, which is especially uniformly coated with corundum, is coated by a further synthetic resin layer.

BRIEF DESCRIPTION OF THE DRAWINGS

Essential details of the present invention will now be described with reference to an exemplary embodiment. In the figures.

DETAILED DESCRIPTION

Figure 1:
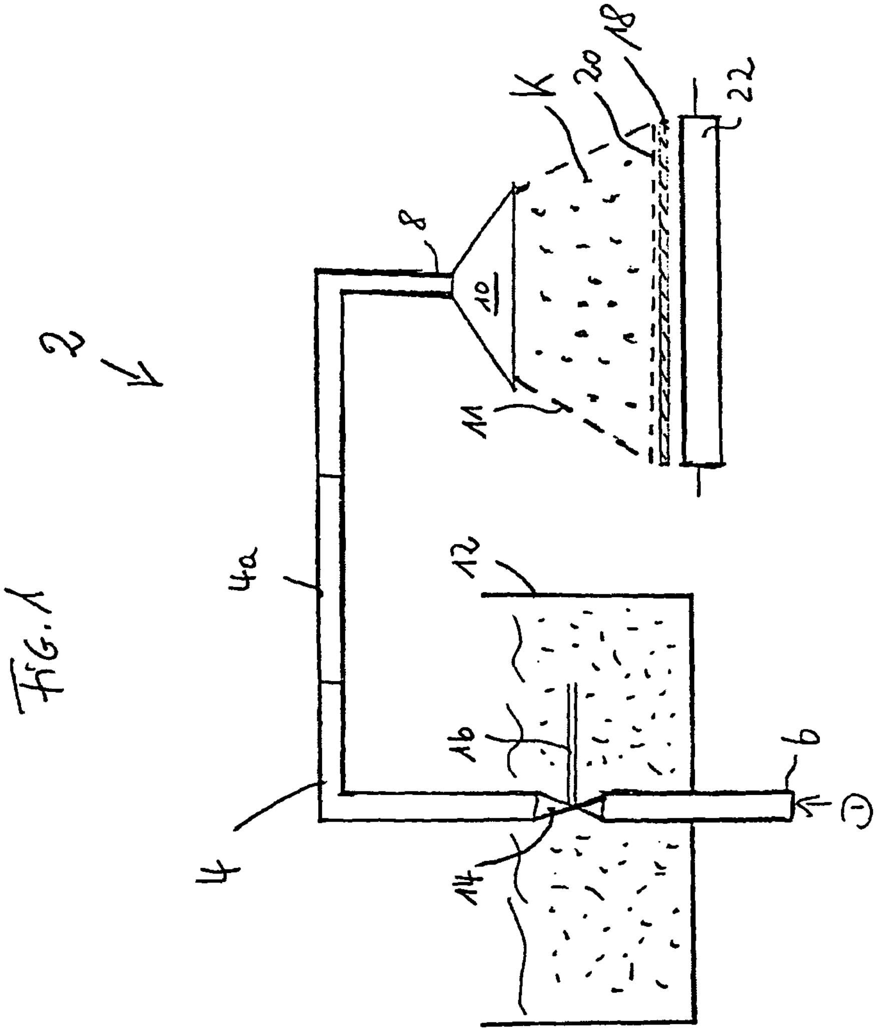
FIG. 1 is a schematic representation of a preferred embodiment of the apparatus according to the present invention.

FIG. 1 illustrates an apparatus 2 for spraying particulate solids. In apparatus 2, feed line 4 has a first end 6 coupled to a pressurized-air line schematically shown at "D". Line 4 (here with a line diameter of 6 mm) and therefore also the Venturi nozzle, has an air flow volume of 1.5 $m^3/h$ applied to it by means of the pressurized-air line D. The second end, the free opening 8 of line 4, is provided with a spraying nozzle 10. Line 4 passes through reservoir 12 containing particulate corundum. The corundum has a specific weight of 4 $g/cm^3$. In the area of reservoir 12 containing corundum, a Venturi nozzle 14 is inserted in line 4. Corundum is sucked out of reservoir 12 by the suction caused by Venturi nozzle 14 through a vacuum line 16 in operation, and in a swirled state into the feed line. The transportation airflow has a pressure of 6 bar.

Reservoir 12 is open to the ambient. It is regularly refilled as the corundum is consumed. Line 4 is predominantly made of stainless steel. It does, however, also have a portion 4*a* of flexible plastic material. At least in those areas in which plastic parts are being used, the apparatus is grounded to avoid an electrostatic charge. By means of a flexible plastic line 4*a* the free opening 8 with nozzle 10 set on it is allowed to be positioned at exactly the desired distance to the substrate to be coated.

Under the above indicated pressure conditions, an amount of 50 $g/m^2$ corundum, schematically shown at "K" is taken out of reservoir 12 and transferred to the gas flow, and is sprayed by spraying nozzle 10. Corundum K has an average diameter of 60 μm. Corundum K is sprayed onto the surface of substrate 18 by nozzle 10. Substrate 18, in the present case a high-density fiber board, is coated with a wet and adhesive, not yet cured layer 20 of melamine resin (layer thickness 50 μm).

Spraying cone 11 of spraying nozzle 10 is indicated in FIG. 1; it extends over the entire width of high-density fiber board 18. Substrate 18 is passed below spraying nozzle 10 at a speed of 60 m/min by conveyer means, which are indicated as a roller 22.

50 $g/m^2$ corundum K with a distribution accuracy of 0.5 $g/m^2$ are sprayed into melamine resin layer 20. The corundum particles sink almost completely into melamine resin layer 20. Subsequent to spraying of the corundum particles, the melamine resin layer is dried. Because corundum particles and melamine resin show almost identical indices of refraction, a transparent layer is created.

Further exemplary embodiments explain the advantages of the present invention:

Example 1

An overlay paper with a paper weight of 30 $g/m^2$ and a web width of 210 cm is filled with liquid melamine resin in an impregnation system with squeeze-roller dosage. The amount of melamine resin applied is about 120 $g/m^2$. The solids content of the melamine resin is 50%. The impregnated overlay paper will be referred to as an impregnate in the following. 20 $g/m^2$ corundum powder (particle size 40 μm) is sprayed onto the impregnate using a spraying apparatus having 12 spraying nozzles over a web width of 210 cm onto the top side of the wet impregnate. The spraying apparatus corresponds to the apparatus illustrated in FIG. 1. The web velocity of the impregnate below the 12 fixed spraying nozzles is about 80 m/min.

The corundum powder is applied to the surface of the impregnate with a distribution accuracy of 0.5 $g/m^2$. The corundum powder applied to the impregnate sinks into the melamine resin layer. The corundum powder is completely enveloped by the melamine resin. The thickness of the melamine resin/corundum layer is about 100 μm measured after drying. Envelopment of the corundum powder by the melamine resin as far as possible, or completely, if possible, is a precondition for the transparent coating desired.

The corundum-containing overlay paper is dried to a residual moisture of 16 to 18 weight % with respect to dry matter content of the impregnate in an air flotation dryer. Subsequently, an additional melamine layer of 30 $g/m^2$ to 40 $g/m^2$ is applied to the underside of the impregnate with a screen applying mechanism. While passing through further drying zones of the air flotation dryer, a residual moisture of 6 weight % to 7 weight % of the impregnate is adjusted.

The corundum-containing substrate is turned over and pressed onto a high-density fiber board in combination with melamine resin impregnated decorative paper. The resulting board can be used as a high-grade surface for laminate flooring in abrasion class AC4.

Example 2

A high-density fiber board (HDF) is decoratively patterned on its top side with a direct print in a 3-color printing process. Subsequently, a melamine resin layer of 60 $g/m^2$ is applied using a roller-applying mechanism. 15 $g/m^2$ corundum powder (particle size: 60 μm) is sprayed into the still liquid melamine resin with an apparatus schematically illustrated in FIG. 1.

The melamine coating with the embedded corundum powder is predried in a hot air dryer to such an extent that the surface coating has a residual moisture of about 15 weight % with respect to dry matter. Next, a further protective layer of cellulose fibers and melamine resin is applied, and this surface structure is precondensed with hot air to such an extent that it is adhesive-free, but the melamine resin is not yet cross-linked.

The printed and corundum-coated board is pressed in a short-cycle press (16 sec. at 160° C. on the board surface, 3 $N/mm^2$). Herein, a melamine film is applied to the underside of the high-density fiber board as a counteracting layer, which ensures that the underside of the board is protected and the board remains planar. The finished board is suitable as a panel for decorating walls, ceilings or floors.

Example 3

Figure 2:
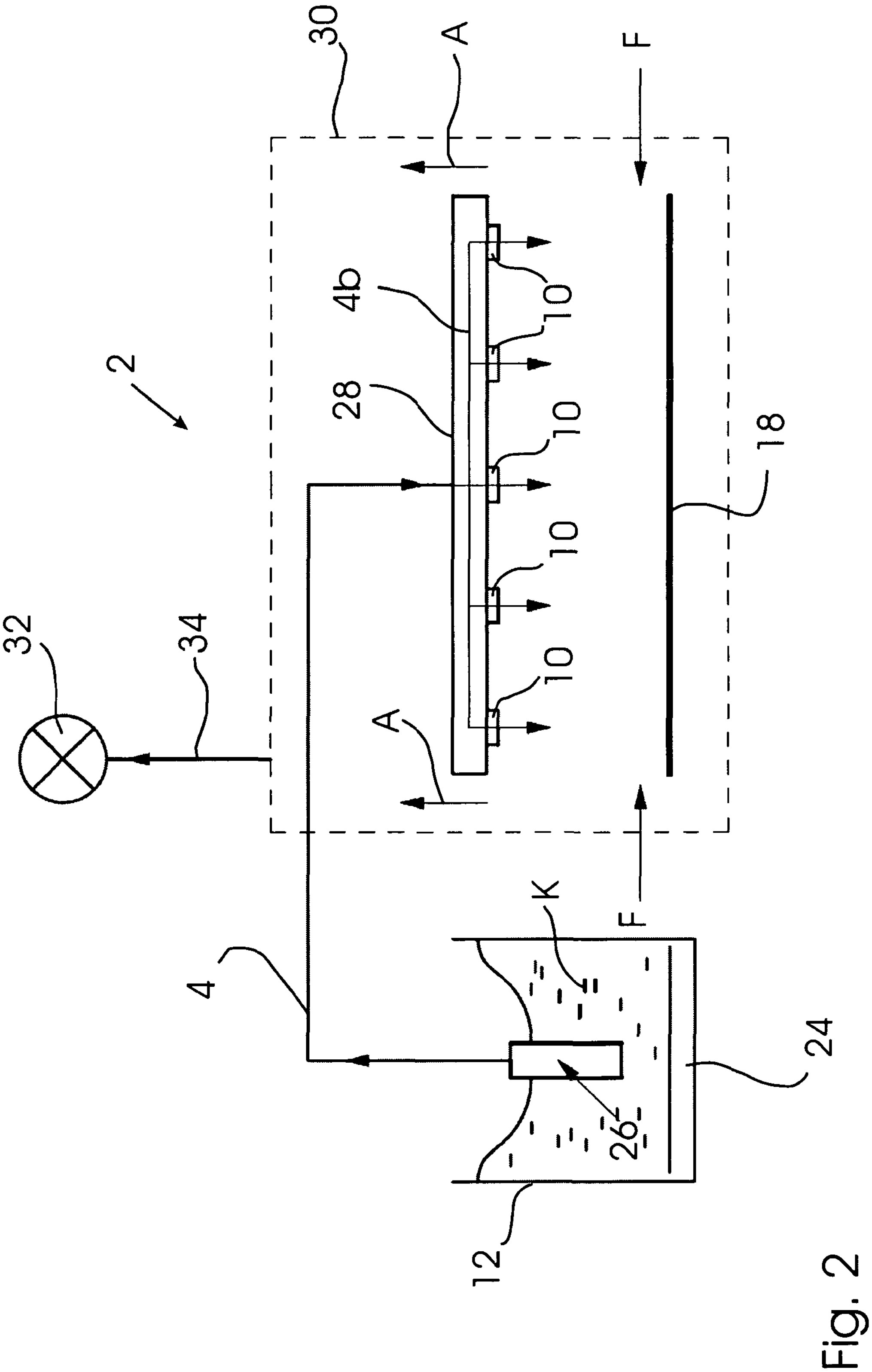
FIG. 2 is a schematic representation of a preferred embodiment of the apparatus according to the present invention with a plurality of nozzles.
Figure 3:
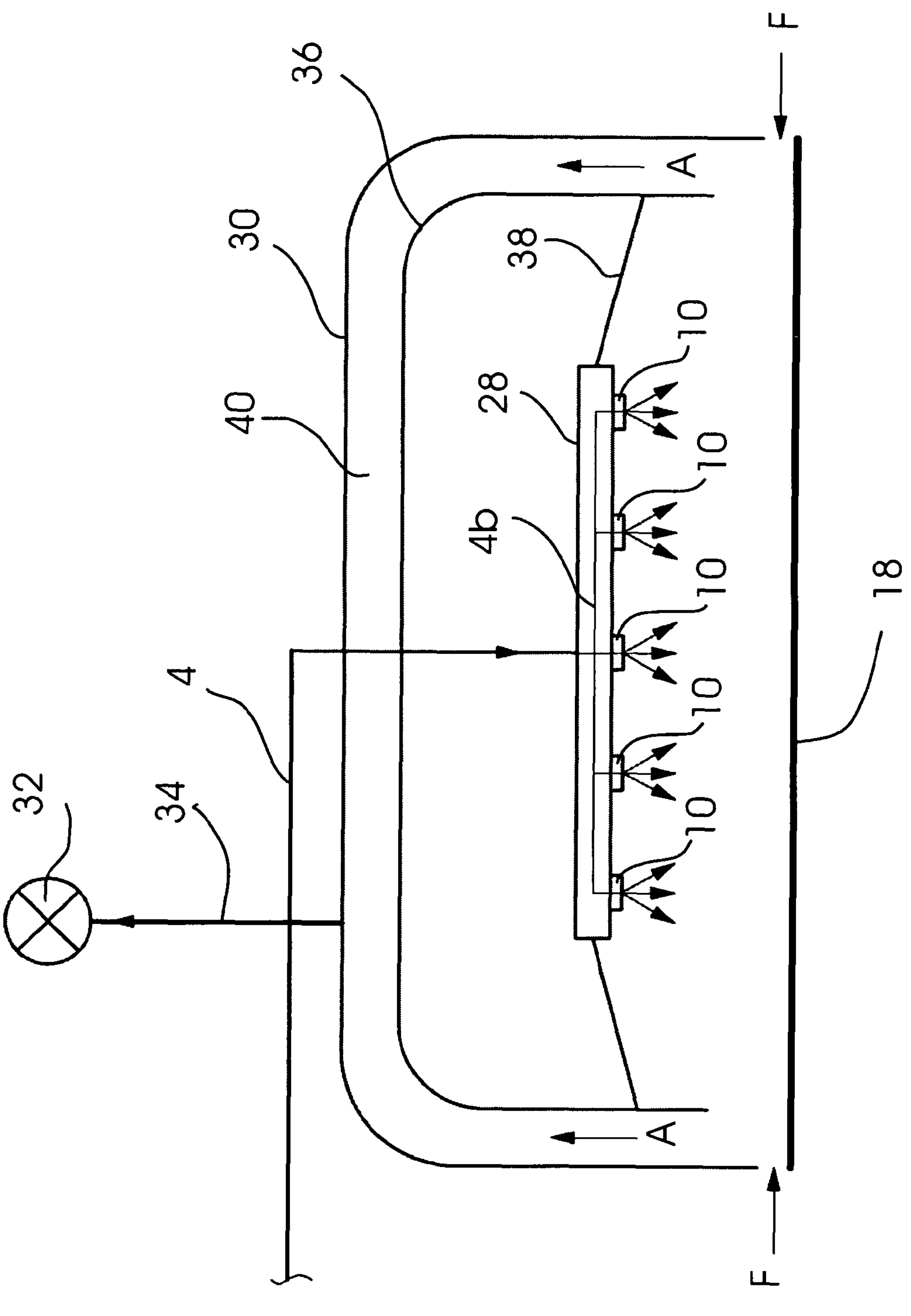
FIG. 3 is a schematic representation of the exhaust system of a preferred embodiment of the apparatus according to the present.

With reference to FIGS. 2 and 3 in the following a preferred embodiment of the apparatus according to the invention is explained. In the FIGS. 2 and 3, the same reference numerals design the same parts as in FIG. 1.

The reservoir 12 which contains the corundum K is equipped with a base 24 with air inlets. Via base 24 with air inlets air flows through the reservoir 12 from the lower area, thereby fluidizing the corundum. The unit comprising Venturi-nozzle 14 and vacuum intake line 16, which is described in detail in FIG. 1, is shown here as injector 26. The injector 26 supplies one or several lines 4 through which the swirled corundum is fed to the spraying nozzles 10. The pressure in the feed lines is usually 0.2 to 4 bar, mostly 1 to 3.5 bar.

The line or the lines 4 empty into a nozzle holder 28, which accommodates a plurality of nozzles 10 which are distributed across the width of the substrate 18. The nozzle holder 28 distributes the swirled corundum K via distribution lines 4*b*, which are arranged in the nozzle holder 28, to the spraying nozzles 10. The nozzle holder 28 can be adjusted individually in its height over the substrate. Within the nozzle holder 28 the spraying nozzles 10 are individually adjustable around their axes.

The nozzle holder 28 is encircled by a casing 30 which is indicated in FIG. 2. An extraction system 32 is connected with the casing 30. The extraction system 32 extracts via extraction line 34 the carrier air which is ejected from the spraying nozzles 10. The airflow of the extracted air is indicated as A in FIG. 2. Thus, undesired swirls on the substrate are avoided. In order to avoid a vacuum, the casing 30 is open towards the environment, preferably at the height of the substrate 18. Further, feed air F can be taken in to achieve a pressure equilibrium.

FIG. 3 shows a preferred embodiment of the spray and extraction device. In order to avoid deposits on the upper side of the nozzle holder 28, an inner casing 36 is mounted into the casing 30. Further, a cover 38 is inserted between the side of the nozzle holder 28 and the inner casing 36. Thus, an exhaust channel 40 is created which channels the exhaust air A and—if required—feed air F. The exhaust 32 creates this air stream via exhaustion line 34. The embodiment according to FIG. 3 prevents effectively deposits on the upper side of the nozzle holder 28.

The invention claimed is:

1. A method for spraying particulate solids onto a substrate, which is covered by a wet and/or adhesive synthetic resin layer, comprising the steps of:

coating the substrate (18) with a wet and/or adhesive synthetic resin layer, building up gas pressure in a line (4), generating a pressure change in the line (4), swirling and carrying along particulate solids (K) having a specific weight of more than 2 g/cm3 in the line (4), ejecting swirled, particulate solids (K) from the line (4) into the wet and/or adhesive synthetic resin layer (20) of the substrate (18), wherein the particulate solid (K) is applied to the substrate (18) with an accuracy of up to ±0.5 $g/m^2$.

2. The method according to claim 1, wherein the wet and/or adhesive synthetic resin layer is dried or cured after inserting the particulate solids.

3. The method according to claim 1, wherein after the insertion of the particulate solids and drying or curing, if any, of the synthetic resin layer, a further synthetic resin layer is applied.

4. The method according to claim 1, wherein the ejection of swirled, particulate solids (K) from the line (4) is adjustable by a spraying nozzle (10).

5. The method according to claim 1, wherein the swirled, particulate solids (K) are applied onto the substrate (18) by means of a spraying nozzle (10), which is moved in parallel and/or vertical to the surface of the substrate (18) during spraying.

6. The method according to claim 1, wherein the particulate solid (K) is applied to the substrate (18) in an amount of up to 100 $g/m^2$.

7. The method according to claim 1, wherein the particulate solid (K) is applied to the substrate (18) with an accuracy of up to ±0.1 $g/m^2$.

8. A method for spraying particulate solids onto a substrate which is covered by a wet and/or adhesive synthetic resin layer, comprising the steps of:

building up gas pressure in a line (4) communicated with a source of particulate solids (K), generating a pressure change in the line (4) so as to draw the particulate solids (K) into an inlet of the line (4) and carry the particulate solids (K) in a swirling flow through the line (4), wherein the particulate solids (K) have a specific weight of more than 2 $g/cm^3$, and ejecting the particulate solids (K) from an outlet of the line (4) onto the wet and/or adhesive synthetic resin layer (20) of the substrate (18).

* * * * *